United States Patent

Mori et al.

[11] Patent Number: 5,861,350
[45] Date of Patent: Jan. 19, 1999

[54] DIELECTRIC CERAMIC COMPOSITION

[75] Inventors: Toru Mori, Tokyo; Tadahiko Horiguchi; Shinji Ito, both of Hyogo, all of Japan

[73] Assignee: NEC Corporation, Tokyo, Japan

[21] Appl. No.: 873,587

[22] Filed: Jun. 12, 1997

[30] Foreign Application Priority Data

Jun. 17, 1996 [JP] Japan .................................. 8-155705

[51] Int. Cl.⁶ ................................................. C04B 35/472
[52] U.S. Cl. ...................................... 501/136; 232/62.9 PZ
[58] Field of Search ....................... 501/136; 252/62.9 PZ

[56] References Cited

FOREIGN PATENT DOCUMENTS

| | | |
|---|---|---|
| 48-81097 | 10/1973 | Japan . |
| 58-60671 | 4/1983 | Japan . |
| 60-36371 | 2/1985 | Japan . |
| 60-42277 | 3/1985 | Japan . |
| 1-298061 | 12/1989 | Japan . |
| 3-223162 | 10/1991 | Japan . |
| 4-115408 | 4/1992 | Japan . |

*Primary Examiner*—Deborah Jones
*Attorney, Agent, or Firm*—Young & Thompson

[57] ABSTRACT

A dielectric ceramic composition is herein disclosed which comprises four lead-containing perovskite compounds of (a) lead magnesium tungstate $[Pb(Mg_{1/2}W_{1/2})O_3]$, (b) lead nickel niobate $[Pb(Ni_{1/3}Nb_{2/3})O_3]$, (c) lead titanate ($PbTiO_3$) and (d) lead zirconate ($PbZrO_3$) as main components and which further contains an oxide of a rare earth element; and by adjusting a molar ratio of the components (a) to (d) and an amount of the oxide of the rare earth element in specific ranges, there can be obtained the dielectric ceramic composition suitable for a dielectric substance for a multilayer ceramic capacitor which has a low firing temperature, a high dielectric constant at room temperature and a low change rate of the dielectric constant to temperature.

11 Claims, 2 Drawing Sheets

DIELECTRIC CERAMIC COMPOSITION

BACKGROUND OF THE INVENTION

1. Field of the Invention

The present invention relates to a dielectric ceramic composition, and more specifically, it relates to a dielectric ceramic composition capable of forming a dielectric substance which has a relatively high dielectric constant and excellent temperature properties thereof and which is suitable for a multilayer ceramic capacitor by firing the composition at a low temperature of 1100° C. or less.

2. Description of the Related Art

As a dielectric ceramic composition for use in a multilayer ceramic capacitor, a composition containing barium titanate as a main component (hereinafter referred to as "the barium titanate compound") has been heretofore widely used. In particular, the barium titanate compound has been widely used as a dielectric ceramic composition for a multilayer ceramic capacitor having Y5V characteristics [-30° C. to +85° C., ΔC/C (20° C.), +22% to -82%] and X7R characteristics [-55° C. to 125° C., ΔC/C (20° C.), ±15%] of EIA standards.

A firing temperature of the barium titanate compound is as high as 1300° C. or more, and therefore, as an internal electrode for the barium titanate compound, inexpensive silver palladium cannot be used because of a low melting point. An inexpensive base metal such as nickel has a high melting point, but when it is baked in air, its oxide is formed inconveniently. For this reason, the base metal cannot be used, either. Accordingly, it is necessary that expensive platinum, palladium or the like should be used as the internal electrode, which leads to the increase of cost. Furthermore, the barium titanate compounds having temperature properties (e.g., Y5U characteristics or Y5T characteristics) between the Y5V characteristics and the X7R characteristics have scarcely been reported.

On the other hand, in order to solve problems in the case that the barium titanate compound is used as a dielectric substance for the laminated ceramic capacitor, the application of a lead-containing perovskite compound to the dielectric substance has been widely researched, and a part of the researches has been put to practical use.

Some of lead-containing perovskite compounds have a firing temperature of 1100° C. or less, and when any of such compounds is used, there is an advantage that inexpensive silver palladium or the like can be used as an internal electrode for the multilayer ceramic capacitor. In addition, by combining a plurality of lead-containing perovskite compounds, there can be widely designed various materials ranging from a high dielectric material having a dielectric constant of 2000 or more at room temperature to a material which scarcely changes at a temperature of such a dielectric constant as to meet the X7R characteristics of the EIA standards. Examples of the former include three kinds of lead-containing perovskite compounds such as lead magnesium niobate [PMN: $Pb(Mg_{1/3}Nb_{2/3})O_3$], lead titanate (PT: $PbTiO_3$) and lead nickel niobate [PNN: $Pb(Ni_{1/3}Nb_{2/3})O_3$] mentioned in Japanese Patent Application Laid-open No. 81097/1973. Examples of the latter are mentioned in, for example, Japanese Patent Application Laid-open No. 060671/1983, 042277/1985 and 036371/1985.

However, in Japanese Patent Application Laid-open No. 060671/1983, it is described that a capacitance change of the capacitor by a temperature at 30° to 85° C. can be controlled to ±22% or less (which corresponds to the Y5S characteristics of the EIA standards) by the use of the lead-containing perovskite compound as the dielectric substance, but there is a problem that the dielectric constant at room temperature lowers in most of the cases that compositions capable of decreasing the change of the capacitance by the temperature are employed.

Furthermore, there also exist a means for improving the temperature properties of the capacitance by adding a manganese compound, but in this case, there is a problem that a second phase of a pyrochlore phase, lead oxide or the like is formed, so that the dielectric constant noticeably lowers.

As another means for improving the temperature properties of the capacitance, a method has been present which comprises replacing a part of lead (Pb) in the lead-containing perovskite compound with barium (Ba), strontium (Sr) or calcium (Ca) which is another alkali earth metal. For example, Japanese Patent Application Laid-open No. 298061/1989 has disclosed a composition in which a part of Pb in a complex perovskite compound of lead magnesium niobate [PMN: $Pb(Mg_{1/3}Nb_{2/3})O_3$], lead titanate (PT) and lead zirconate (PZ: $PbZrO_3$) is replaced with at least one element of Ba and Sr. However, some of the complex perovskite compounds mentioned in Japanese Patent Application Laid-open No. 298061/1989 have a firing temperature of 1000° to 1300° C., so that for a part of such complex perovskite compounds, inexpensive silver palladium cannot be utilized as an internal electrode.

Furthermore, Japanese Patent Application Laid-open No. 115408/1992 has disclosed compositions in which a part of Pb in a composite of lead magnesium niobate (PMN) and another lead-containing perovskite compound is replaced with Ba, Sr, Ca or Ag. In these compositions, however, it has been difficult to control the temperature properties of the dielectric constant to ±22% or less in the range of -30° to +85° C.

On the other hand, in Japanese Patent Application Laid-open No. 223162/1991, there have been disclosed compositions in which lead manganese niobate [PMnNb: $Pb(Mn_{1/3}Nb_{2/3})O_3$] is added to a complex perovskite compound of lead magnesium tungstate [PMW: $Pb(Mg_{1/2}W_{1/2})O_3$], lead nickel niobate (PNN), lead titanate (PT) and lead zirconate (PZ). In these compositions, the dielectric constant at room temperature is 8000 or more and the Y5T characteristics regarding the capacitance (-30° C. to +85° C., ΔC/C (20° C.), +22% to -33%) can be met, but there is still a problem that a change rate of the dielectric constant cannot be controlled to ±22% or less.

SUMMARY OF THE INVENTION

As described above, a lead-containing perovskite compound has various advantages as a dielectric substance of a laminated ceramic capacitor, but in order to satisfy requirements such as further miniaturization, further capacity increase and further performance improvement of the multilayer ceramic capacitor, some points to be bettered have been present. That is to say, nowadays, there has not been found a dielectric ceramic composition containing, as a main component, a lead-containing perovskite compound in which a firing temperature is 1100° C. or less in addition to the advantages of a conventional technique that a dielectric constant at room temperature is high and the change of the dielectric constant by a temperature is small.

Furthermore, when a Pb ion site of the lead-containing perovskite compound is replaced with another alkali earth metal (Ba, Sr or Ca), the maximum value of the dielectric constant decreases but a Curie point largely shifts to a low temperature side, so that a material design is difficult.

On the other hand, with the miniaturization and a higher capacitance of the multilayer ceramic capacitors in recent years, the very thin single layers having a thickness of 10 μm or less have been desired, and in order to meet such a requirement, the dielectric ceramic composition is required to have a grain size of 2 to 3 μm or less and a high bending strength in the case that a dielectric ceramic is obtained by firing.

An object of the present invention is to provide a dielectric ceramic composition which can sufficiently meet the above-mentioned requirements in this field, i.e., to provide a dielectric ceramic composition in which a firing temperature is 1100° C. or less, preferably between 950° C. and 1100° C., a dielectric constant at room temperature is high, preferably 4000 or more, and a change of the dielectric constant at −30 to +85° C. is −30% or less, preferably ±22% or less.

The present invention which can achieve the above-mentioned object is directed to a dielectric ceramic composition which comprises four lead-containing perovskite compounds of (a) lead magnesium tungstate $[Pb(Mg_{1/2}W_{1/2})O_3]$, (b) lead nickel niobate $[Pb(Ni_{1/3}Nb_{2/3})O_3]$, (c) lead titanate ($PbTiO_3$) and (d) lead zirconate ($PbZrO_3$) as main components and which further contains an oxide of a rare earth element, wherein as composition ratios (molar ratios) of the above-mentioned main components (a) to (d) are represented by x, y, z and u (however, x+y+z+u=1), respectively, and as these composition ratios are shown on a composition drawing of a regular tetrahedron, the composition ratios of these components are present on or in the range of a hexahedron defined by the following points BCDAEFGH:

points on a face of u=0.20:
  A: (x, y, z)=(0.08, 0.40, 0.32)
  B: (x, y, z)=(0.40, 0.04, 0.36)
  C: (x, y, z)=(0.455, 0.04, 0.305)
  D: (x, y, z)=(0.145, 0.40, 0.255)
points on a face of u=0.40:
  E: (x, y, z)=(0.17, 0.30, 0.13)
  F: (x, y, z)=(0.35, 0.02, 0.23)
  G: (x, y, z)=(0.405, 0.02, 0.175)
  H: (x, y, z)=(0.215, 0.30, 0.085), and the oxide of the rare earth element is contained in an amount of 0.1 to 5.0 mol % based on the total mol of the lead-containing perovskite compounds (a) to (d).

The regular tetrahedron as the composition drawing which shows the composition molar ratios of the above-mentioned four components (a) to (d), and the above-mentioned points A to H are as shown in FIG. 1. If the value of u is less than 0.20, there is a problem that the temperature properties of the dielectric constant of the composition cannot be effectively improved, and if it is more than 0.40, there is another problem that the dielectric constant of the composition is too small and a firing temperature in obtaining a dielectric ceramic is high.

Furthermore, the dielectric ceramic composition of the present invention can also be obtained under conditions that the amount of PbO in the above-mentioned composition is deficient as much as 0.1 to 2.0 mol % based on a stoichiometric amount.

The dielectric ceramic composition of the present invention has the above-mentioned specific components, whereby the composition can possess characteristics that the firing temperature is 1100° C. or less, preferably 950° C. to 1100° C., the dielectric constant at room temperature is high, preferably 4000 or more, and a change of the dielectric constant at −30 to +85° C. is −30% or less, preferably ±22% or less. Therefore, according to the dielectric ceramic composition of the present invention, the performance improvement, miniaturization and capacitance increase of a multilayer ceramic capacitor, and the decrease of a manufacturing cost can be realized.

DETAILED DESCRIPTION OF THE INVENTION AND PREFERRED EMBODIMENTS

Figure 1:
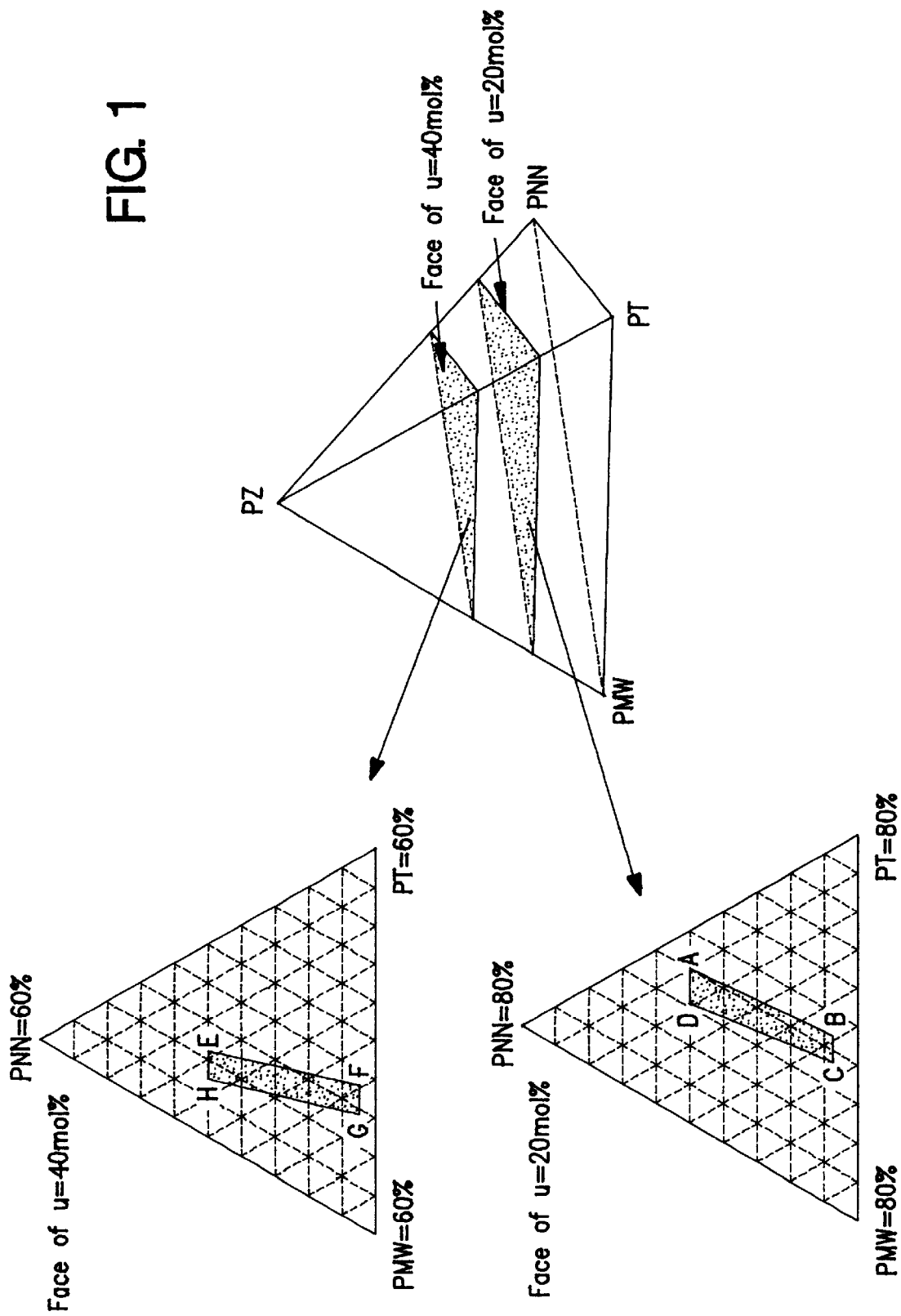
FIG. 1 is a regular tetrahedron graph and a plane graph showing a composition ratio of main components in the present invention.

A dielectric ceramic composition of the present invention can be manufactured by firing a material mixture obtained by mixing necessary materials so as to have a specified composition on a composition drawing of the above-mentioned regular tetrahedron.

Examples of materials which can be used to prepare a material mixture for the production of lead-containing perovskite compounds include lead oxide, magnesium oxide, nickel oxide, tungsten oxide, titanium oxide and zirconium oxide. These materials can suitably be altered.

Furthermore, as an oxide of a rare earth element, for example, one or more selected from the group consisting of $La_2O_3$, $Nd_2O_3$, $Sm_2O_3$, $Gd_2O_3$ and $Yb_2O_3$ can be utilized. The amount of the rare earth element oxide to be added is in the range of 0.1 to 5.0 mol % of the total mol of the components (a) to (d). For example, in the case that the total mol of the components (a) to (d) are 100 mol, the rare earth element oxide is added so that the mol of the rare earth element oxide may be in the range of 0.1 to 5.0 mol. If the amount of the rare earth element oxide is more than this range, a dielectric constant is too low and a firing temperature in forming a dielectric substance is too high. Thus, it is not preferable to use the rare earth element oxide in such an excessive amount.

In addition, since a shift quantity of each Curie point depends upon the kind of rare earth element oxide, the Curie point can be brought close to room temperature by selecting the suitable rare earth element oxide, even if the Curie points of the main components (a) to (d) deviate from room temperature. By this depression effect, the temperature properties of the dielectric constant can be improved. In the case that the rare earth element oxide is used for such an object, Curie temperatures of the main components are suitably in the range of about 10° to 70° C. That is to say, the rare earth element oxide has no function of shifting the Curie point to a higher temperature side, and therefore, when the Curie points of the main components are too low, the temperature properties of the dielectric constant cannot be improved on occasion, and when it is too high, the Curie points cannot be adjusted to suitable values on occasion.

In addition to the above-mentioned components (a) to (d) and the rare earth element oxide, if necessary, another component can be added to the dielectric ceramic composition of the present invention, the amount of the other component being such that the effect of the present invention is not impaired. For example, lead manganese niobate [Pb(Mn$_{1/3}$Nb$_{2/3}$)O$_3$] can be added in an amount of 0.1 to 5.0 mol % based on the total mol of the main components (a) to (d), whereby the temperature properties of the dielectric constant can further be improved. If the amount of the lead manganese niobate to be added is more than this range, the improvement effect of the temperature properties cannot be exerted and the dielectric constant merely lowers, and the firing temperature in forming the dielectric ceramic also rises inconveniently.

Furthermore, the dielectric ceramic composition of the present invention can also be obtained under conditions the amount of PbO in the above-mentioned composition is deficient as much as 0.1 to 2.0 mol % based on a stoichiometric amount.

In the case that the amount of PbO is decreased, an optimum firing temperature in forming the dielectric substance slightly rises, but bending strength can be improved and dielectric properties is about the same as in the stoichiometric amount composition. Therefore, the contemplation of strength improvement is possible. However, even if the deficient amount is more than 2 mol %, any practical problem is not present, but the optimum firing temperature in forming the dielectric ceramic exceeds 1100° C. Thus, from the viewpoint of a cost reduction, it is preferable that the deficient amount is 2 mol or less.

The material mixture can be prepared by any of various methods, and for example, it can be obtained by wet-mixing materials thus selected in a conventional manner. The thus obtained material mixture is calcined at 800° to 900° C., and if necessary, the calcined material is then wet-ground in a conventional manner. Afterward, a solid is collected by filtration, and then dried to obtain a powdery dielectric ceramic composition. The morphology of the composition is not limited to the powdery state, but in order to obtain the dielectric ceramic having a desired shape by firing, the powdery morphology is preferable. In the case of the powdery morphology, various particle diameters are acceptable, but for example, a particle diameter of 0.1 to 1 $\mu$m is preferable. Moreover, for the formation of thin films, the particle diameter of the calcined material is preferably in the range of about 2 to 3 $\mu$m.

The thus obtained powdery dielectric ceramic composition is molded into a desired shape by a press or the like, and then fired at 950° to 1100° C. to obtain the dielectric ceramic. By the use of this dielectric ceramic, a multilayer ceramic capacitor can be manufactured.

When a dielectric ceramic composition of the present invention is used, a dielectric ceramic can be obtained in which a firing temperature in obtaining the dielectric ceramic for a capacitor is 1100° C. or less, preferably 950° to 1100° C., a dielectric constant is 4000 or more, preferably 5000 or more, and a change of the dielectric constant based on +20° C. at −30 to +85° C. is −30% or less, preferably ±22% or less.

Example 1 and Comparative Example 1

As starting materials, there were selectively used lead oxide (PbO), magnesium oxide (MgO), nickel oxide (NiO), tungsten oxide (WO$_3$), titanium oxide (TiO$_2$), zirconium oxide (ZrO$_3$), various rare earth element oxides, manganese carbonate (MnCO$_3$) and niobium oxide (Nb$_2$O$_5$), and necessary amounts of the materials to be weighed were decided on the basis of composition ratios of Composition Nos. 1 to 40 shown in Table 1.

Next, the necessary amounts of the selected materials were weighed, wet-mixed in a resin ball mill, and then calcined (prebaked) at 800° to 900° C., and the thus calcined material was then wet-ground in the resin ball mill. Afterward, the solid was collected by filtration, and then dried to obtain a powdery dielectric ceramic composition. A particle diameter of the thus obtained composition was about 0.6 $\mu$m in terms of a BET specific surface area.

This powdery composition was pressed into discs having a diameter of about 15 mm and a thickness of about 1.5 mm, and then subjected to a main firing at 950° to 1100° C. to obtain disc-like dielectric substance samples. Next, a silver paste was applied onto both the surfaces of these dielectric ceramic samples, and these samples were then baked in an electric furnace to obtain electrodes, whereby capacitors were obtained. Capacitances (C) of the obtained capacitors at −30° C., room temperature, +20° C. and +85° C. were measured by the use of an LCR meter to obtain dielectric constants under the respective temperature conditions. Table 2 shows the thus obtained values of the respective compositions.

In Tables 1 and 2, PMW, PNN, PT and PZ represent the above-mentioned lead-containing perovskite compounds (a) to (d), respectively. An optimum firing temperature in Table 2 is a temperature of the main firing at which the dielectric constant at a temperature showing the maximum dielectric constant is highest (the so-called Curie point), and a change rate n is a change rate of the dielectric constants at −30° C. and +85° C. on the basis of the dielectric constant at +20° C. Moreover, "*" represents a comparative example. In addition, "−" in Table 1 means no addition, and "−" in Table 2 means no measurement.

On the other hand, for the disc-like dielectric substance samples having compositions of Composition Nos. 21 and 24 to 27, bending strength was measured by a three-point bending method. The results are shown in Table 3.

TABLE 1

| Comp. No. | Main Components Composition Ratio (mol %) | | | | Rare Earth Element Oxide (addition ratio: mol %) | PbMnNb Addition Ratio (mol %) | PbO Deficit Ratio (mol %) |
|---|---|---|---|---|---|---|---|
| | PMW | PNN | PT | PZ | | | |
| *1 | 40.0 | 4.0 | 36.0 | 20.0 | — | — | |
| 2 | 40.0 | 4.0 | 36.0 | 20.0 | La$_2$O$_3$ (2.0) | — | |
| 3 | 40.0 | 4.0 | 36.0 | 20.0 | Nd$_2$O$_3$ (2.5) | — | |
| 4 | 40.0 | 4.0 | 36.0 | 20.0 | Nd$_2$O$_3$ (2.5) | 1.0 | |
| *5 | 30.0 | 20.0 | 30.0 | 20.0 | — | — | |
| 6 | 30.0 | 20.0 | 30.0 | 20.0 | Nd$_2$O$_3$ (0.5) | — | |
| 7 | 30.0 | 20.0 | 30.0 | 20.0 | Sm$_2$O$_3$ (1.0) | — | |
| 8 | 30.0 | 20.0 | 30.0 | 20.0 | Gd$_2$O$_3$ (1.0) | 2.0 | |
| *9 | 44.0 | 3.0 | 28.0 | 25.0 | — | — | |
| 10 | 44.0 | 3.0 | 28.0 | 25.0 | Gd$_2$O$_3$ (1.0) | 1.0 | |
| *11 | 34.0 | 15.0 | 26.0 | 25.0 | — | — | |
| 12 | 34.0 | 15.0 | 26.0 | 25.0 | Gd$_2$O$_3$ (1.0) | 0.1 | |
| 13 | 34.0 | 15.0 | 26.0 | 25.0 | Gd$_2$O$_3$ (1.0) | 2.0 | |
| 14 | 34.0 | 15.0 | 26.0 | 25.0 | Gd$_2$O$_3$ (1.0) | 5.0 | |
| 15 | 34.0 | 15.0 | 26.0 | 25.0 | Gd$_2$O$_3$ (1.0) | 6.0 | |
| *16 | 18.0 | 35.0 | 17.0 | 30.0 | — | — | |
| 17 | 18.0 | 35.0 | 17.0 | 30.0 | Yb$_2$O$_3$ (1.0) | — | |
| 18 | 18.0 | 35.0 | 17.0 | 30.0 | Yb$_2$O$_3$ (1.0) | 1.0 | |
| *19 | 35.0 | 7.0 | 28.0 | 30.0 | — | — | |
| 20 | 35.0 | 7.0 | 28.0 | 30.0 | La$_2$O$_3$ (1.0) | 2.0 | |
| 21 | 35.0 | 7.0 | 28.0 | 30.0 | Nd$_2$O$_3$ (2.0) | 2.0 | |

TABLE 1-continued

| Comp. No. | Main Components Composition Ratio (mol %) | | | | Rare Earth Element Oxide (addition ratio: mol %) | PbMnNb Addition Ratio (mol %) | PbO Deficit Ratio (mol %) |
|---|---|---|---|---|---|---|---|
| | PMW | PNN | PT | PZ | | | |
| 22 | 35.0 | 7.0 | 28.0 | 30.0 | $Sm_2O_3$ (5.0) | 0.5 | |
| *23 | 35.0 | 7.0 | 28.0 | 30.0 | $Sm_2O_3$ (6.0) | 0.5 | |
| 24 | 35.0 | 7.0 | 28.0 | 30.0 | $Nd_2O_3$ (2.0) | 2.0 | −0.1 |
| 25 | 35.0 | 7.0 | 28.0 | 30.0 | $Nd_2O_3$ (2.0) | 2.0 | −1.0 |
| 26 | 35.0 | 7.0 | 28.0 | 30.0 | $Nd_2O_3$ (2.0) | 2.0 | −2.0 |
| *27 | 35.0 | 7.0 | 28.0 | 30.0 | $Nd_2O_3$ (2.0) | 2.0 | −2.5 |
| *28 | 40.0 | 7.0 | 18.0 | 35.0 | — | — | |
| 29 | 40.0 | 7.0 | 18.0 | 35.0 | $La_2O_3$ (2.5) | 1.0 | |
| *30 | 17.0 | 30.0 | 13.0 | 40.0 | — | — | |
| 31 | 17.0 | 30.0 | 13.0 | 40.0 | $La_2O_3$ (5.0) | 0.5 | |
| *32 | 20.0 | 26.0 | 14.0 | 40.0 | — | — | |
| 33 | 20.0 | 26.0 | 14.0 | 40.0 | $Nd_2O_3$ (5.0) | 0.5 | |
| *34 | 40.0 | 2.0 | 18.0 | 40.0 | — | — | |
| 35 | 40.0 | 2.0 | 18.0 | 40.0 | $Sm_2O_3$ (2.5) | 1.0 | |
| *36 | 30.0 | 20.0 | 35.0 | 15.0 | — | — | |
| *37 | 30.0 | 20.0 | 35.0 | 15.0 | $Gd_2O_3$ (5.0) | 5.0 | |
| *38 | 30.0 | 12.0 | 13.0 | 45.0 | — | — | |
| *39 | 37.5 | 15.0 | 22.5 | 25.0 | $Yb_2O_3$ (2.5) | 2.0 | |
| *40 | 24.5 | 17.5 | 28.0 | 30.0 | $La_2O_3$ (5.0) | 0.5 | |

TABLE 2

| Comp. No. | Optimum Firing Temperature (°C.) | Dielectric Constant $\epsilon$ (20° C.) | Change Rate of Dielectric Constant $\epsilon$ | |
|---|---|---|---|---|
| | | | −30° C. | +85° C. |
| *1 | 975 | 7750 | −49 | −35 |
| 2 | 1000 | 5950 | −24 | −30 |
| 3 | 1000 | 5750 | −23 | −28 |
| 4 | 1000 | 5160 | −18 | −20 |
| *5 | 1000 | 8400 | −35 | −38 |
| 6 | 1025 | 6710 | −19 | −25 |
| 7 | 1025 | 6330 | −17 | −21 |
| 8 | 1025 | 5970 | −15 | −18 |
| *9 | 1000 | 6610 | −42 | −45 |
| 10 | 1025 | 4940 | −24 | −29 |
| *11 | 1000 | 7680 | −40 | −42 |
| 12 | 1025 | 5930 | −23 | −27 |
| 13 | 1050 | 5390 | −18 | −22 |
| 14 | 1075 | 4370 | −22 | −25 |
| 15 | 1075 | 3840 | −27 | −23 |
| *16 | 1050 | 7020 | −39 | −34 |
| 17 | 1075 | 5410 | −26 | −17 |
| 18 | 1075 | 4460 | −11 | −7 |
| *19 | 1000 | 7650 | −32 | +20 |
| 20 | 1025 | 6420 | −22 | −9 |
| 21 | 1050 | 5570 | −18 | −15 |
| 22 | 1100 | 4130 | −21 | −2 |
| *23 | 1125 | 3900 | −25 | −8 |
| 24 | 1050 | — | — | — |
| 25 | 1075 | 5610 | −18 | −16 |
| 26 | 1100 | — | — | — |
| *27 | 1150 | — | — | — |
| *28 | 1000 | 5480 | −54 | +30 |
| 29 | 1025 | 4075 | −18 | −12 |
| *30 | 1050 | 7825 | −48 | +38 |
| 31 | 1100 | 4980 | −13 | −16 |
| *32 | 1025 | 7140 | −46 | +23 |
| 33 | 1075 | 4200 | −13 | −9 |
| *34 | 1025 | 6860 | −41 | −7 |
| 35 | 1050 | 5020 | −12 | −17 |
| *36 | 975 | 11250 | −50 | −38 |
| *37 | 1050 | 6840 | −37 | −30 |
| *38 | 1075 | 3150 | −22 | −14 |
| *39 | 1050 | 2880 | −14 | −24 |
| *40 | 1100 | 3090 | −26 | +1 |

TABLE 3

| Composition No. | Optimum Firing Temperature (°C.) | Bending Strength (average of 10 points) |
|---|---|---|
| 21 | 1050 | 920 |
| 24 | 1050 | 990 |
| 25 | 1075 | 1230 |
| 26 | 1100 | 1180 |
| *27 | 1150 | 950 |

Figure 2:
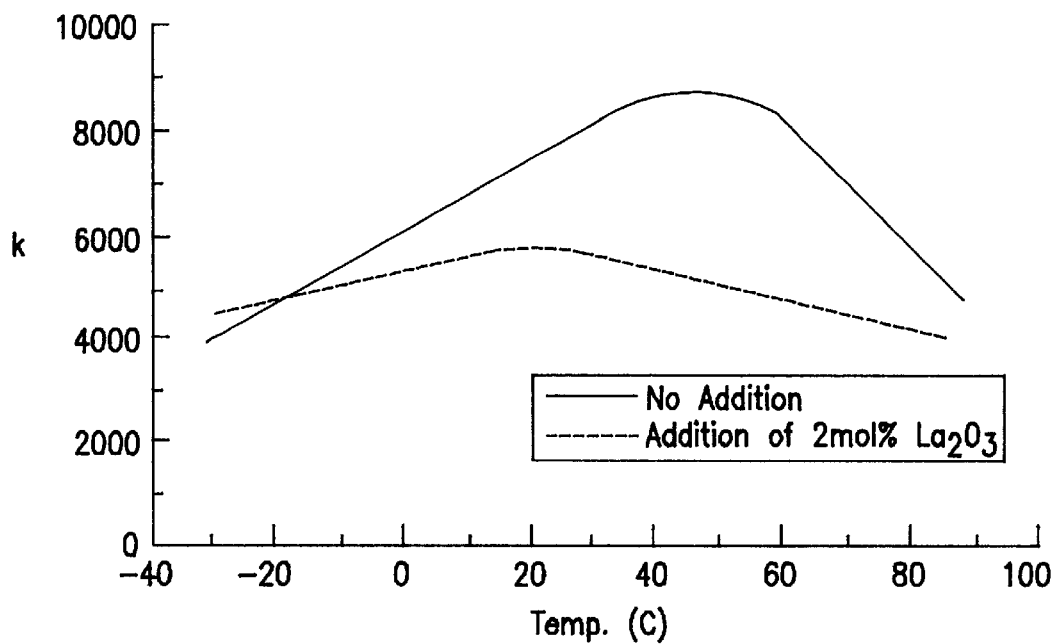
FIG. 2 is a graph showing a temperature dependence (temperature properties) of dielectric constants of Composition Nos. 1 and 2.
Figure 3:
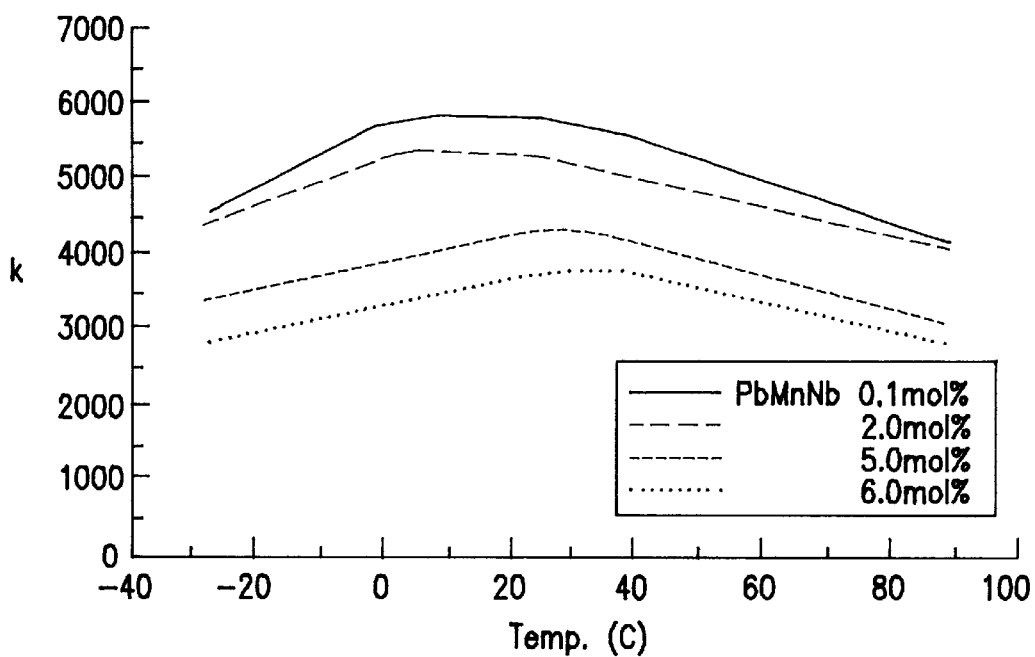
FIG. 3 is a graph showing temperature dependences (temperature properties) of dielectric constants of Composition Nos. 12 to 15, and there are herein shown the dependences of cases where amounts of PbMnNb to be added are 0.1, 2.0, 5.0 and 6.0 (mol %) in the order from above.

Furthermore, temperature dependences (temperature properties) of the dielectric constants of Composition Nos. 1 and 2 were measured in an ordinary manner, and the obtained results are shown in FIG. 2. In addition, temperature dependences (temperature properties) of the dielectric constants of Composition Nos. 12 and 15 were measured in the ordinary manner, and the obtained results are shown in FIG. 3.

As is apparent from the above-mentioned examples and comparative examples, a predetermined amount of a rare earth element oxide can be added to the above-mentioned four lead-containing perovskite compounds (a) to (d) which are the main components, whereby the maximum value of the dielectric constant under the temperature properties can be lowered and so the temperature properties can be improved.

The rare earth element oxide and further lead manganese niobate can be added, whereby a peak of the dielectric constant on a temperature-dielectric constant curve can shift to a low temperature side or a high temperature side in accordance with the amount of added lead manganese niobate, and so the temperature properties can be improved by adjusting the amount of lead manganese niobate to be added.

In addition, an amount of PbO can be made deficient in a predetermined ratio based on a stoichiometric amount, whereby the strength of an obtained dielectric ceramic can be improved.

What is claimed is:

1. A dielectric ceramic composition which comprises four lead-containing perovskite compounds of (a) $Pb(Mg_{1/2}W_{1/2})O_3$, (b) $Pb(Ni_{1/3}Nb_{2/3})O_3$, (c) $PbTiO_3$, and (d) $PbZrO_3$ as main components and which further contains an oxide of a rare earth element, wherein the molar ratios of the main components (a) to (d) are represented by x, y, z, and u, respectively and x+y+z+u=1, said ratios shown on a composition drawing of a regular tetrahedron and are present on or in the range defined by the following points BCDAEFGH:

points on a face of u=0.20:

A: (x, y, z)=(0.08, 0.40, 0.32)

B: (x, y, z)=(0.40, 0.04, 0.36)

C: (x, y, z)=(0.455, 0.04, 0.305)

D: (x, y, z)=(0.145, 0.40, 0.255)

points of a face of u=0.40:

E: (x, y, z)=(0.17, 0.30, 0.13)

F: (x, y, z)=(0.35, 0.02, 0.23)

G: (x, y, z)=(0.405, 0.02, 0.175)

H: (x, y, z)=(0.215, 0.30, 0.085), and the oxide of the rare earth element is contained in an amount of 0.1 to 5.0 mol % based on the total mol of the lead-containing perovskite compounds (a) to (d).

2. The dielectric ceramic composition according to claim 1 wherein the oxide of the rare earth element is one or more selected from the group consisting of $La_2O_3$, $Nd_2O_3$, $Sm_2O_3$, $Gd_2O_3$ and $Yb_2O_3$.

3. The dielectric ceramic composition according to claim 1 which further contains lead manganese niobate [$Pb(Mn_{1/3}Nb_{2/3})O_3$] in an amount of 0.1 to 5.0 mol % based on the total amount of the main components (a) to (d).

4. The dielectric ceramic composition according to claim 1 wherein the amount of PbO in the dielectric ceramic composition is deficient as much as 0.1 to 2.0 mol % based on a stoichiometric amount.

5. A method for preparing a dielectric ceramic composition which comprises four lead-containing perovskite compounds of (a) $Pb(Mg_{1/2}W_{1/2})O_3$, (b) $Pb(Ni_{1/3}Nb_{2/3})O_3$, (c) $PbTiO_3$, and (d) $PbZrO_3$ as main components and which further contains an oxide of a rare earth element, wherein the molar ratios of the main components (a) to (d) are represented by x, y, z, and u, respectively and x+y+z+u=1, said ratios shown on a composition drawing of a regular tetrahedron and are present on or in the range defined by the following points BCDAEFGH:

points on a face of u=0.20:
- A: (x, y, z)=(0.08, 0.40, 0.32)
- B: (x, y, z)=(0.40, 0.04, 0.36)
- C: (x, y, z)=(0.455, 0.04, 0.305)
- D: (x, y, z)=(0.145, 0.40, 0.255 points of a face of u=0.40:
- E: (x, y, z)=(0. 17, 0.30,0.13)
- F: (x, y, z)=(0. 35, 0.02, 0.23)
- G: (x, y, z)=(0.405, 0.02, 0.175)
- H: (x, y, z)=(0.215, 0.30, 0.085), and the oxide of the rare earth element is contained in an amount of 0.1 to 5.0 mol % based on the total mol of the lead-containing perovskite compounds (a) to (d), said method comprising the steps of firing a material mixture obtained by mixing lead oxide, magnesium oxide, nickel oxide, tungsten oxide, titanium oxide, zirconium oxide, and the oxide of the rare earth oxide in a ratio corresponding to the composition.

6. The method for preparing a dielectric ceramic composition according to claim 5 wherein the material mixture is calcined at a temperature in the range of 800° to 900° C. and then fired.

7. The method for preparing a dielectric ceramic composition according to claim 5 wherein the oxide of the rare earth element is one or more selected from the group consisting of $La_2O_3$, $Nd_2O_3$, $Sm_2O_3$, $Gd_2O_3$ and $Yb_2O_3$.

8. The method for preparing a dielectric ceramic composition according to claim 5 wherein manganese carbonate and niobium oxide are added to the material mixture so that the dielectric composition may contain $Pb(Mn_{1/3}Nb_{2/3})_3$ in an amount of 0.1 to 5.0 mol % based on the total amount of the main components (a) to (d).

9. The method for preparing a dielectric ceramic composition according to claim 5 wherein the composition of the material mixture is adjusted so that the amount of PbO in the dielectric ceramic composition may be deficient as much as 0.1 to 2.0 mol % based on a stoichiometric amount.

10. A dielectric substance for a ceramic capacitor which is obtained by firing the dielectric ceramic composition described in claim 1 at a temperature of 1100° C. or less.

11. A dielectric ceramic for a ceramic capacitor which is obtained by firing the dielectric ceramic composition described in claim 1 at a temperature of 950° to 1100° C.

* * * * *